(12) United States Patent
Murakami et al.

(10) Patent No.: US 8,034,849 B2
(45) Date of Patent: Oct. 11, 2011

(54) ADHESIVE COMPOSITION AND ADHESIVE SHEET

(75) Inventors: Masao Murakami, Tochigi (JP); Hirofumi Hashimoto, Tochigi (JP); Noboru Araki, Tochigi (JP)

(73) Assignees: Sony Corporation, Tokyo (JP); Sony Chemical & Information Device Corporation, Tokyo (JP)

( * ) Notice: Subject to any disclaimer, the term of this patent is extended or adjusted under 35 U.S.C. 154(b) by 348 days.

(21) Appl. No.: 11/794,541

(22) PCT Filed: Sep. 12, 2005

(86) PCT No.: PCT/JP2005/016720
§ 371 (c)(1),
(2), (4) Date: Jul. 2, 2007

(87) PCT Pub. No.: WO2006/082672
PCT Pub. Date: Aug. 10, 2006

(65) Prior Publication Data
US 2008/0299388 A1    Dec. 4, 2008

(30) Foreign Application Priority Data
Feb. 3, 2005 (JP) .................................. 2005-027905

(51) Int. Cl.
*C08F 2/50* (2006.01)
*C08J 3/28* (2006.01)
*B32B 17/12* (2006.01)
*B32B 15/04* (2006.01)

(52) U.S. Cl. .................. 522/6; 522/16; 522/33; 522/38; 522/46; 522/40; 522/50; 522/117; 522/182; 428/355 R; 428/355 EN; 428/355 AC

(58) Field of Classification Search ................ 522/6, 16, 522/40, 53, 117; 428/343, 355
See application file for complete search history.

(56) References Cited

U.S. PATENT DOCUMENTS

| 5,478,918 A | * | 12/1995 | Maruta et al. | 528/353 |
| 5,744,513 A | * | 4/1998 | White et al. | 522/116 |
| 2002/0142158 A1 | * | 10/2002 | Ono et al. | 428/343 |

FOREIGN PATENT DOCUMENTS

| JP | 07-034052 | * | 7/1993 |
| JP | 05-331261 | * | 12/1993 |
| JP | A-06-057213 | * | 3/1994 |
| JP | A-07-034052 | * | 2/1995 |
| JP | A-07-278258 | * | 10/1995 |
| JP | A-08-199134 | * | 8/1996 |
| JP | A-11-080595 | * | 3/1999 |
| JP | A-11-236540 | * | 8/1999 |
| JP | A-2000-073025 | * | 3/2000 |
| JP | A-2002-285105 | * | 10/2002 |

OTHER PUBLICATIONS

English Machine Translation of JP 07-034052.*
English Machine Translation of JP 05-331261.*
Takei et al.; Machine English translation of JP 11-80595; pub date Mar. 26, 1999.*
Satake et al.; Machine English translation of JP 8-199134; pub date Aug. 6, 1996.*
Jul. 23, 2010 Japanese Office Action issued in corresponding Japanese Patent Application No. 2005-027905 (w/English translation).

* cited by examiner

*Primary Examiner* — Mark Eashoo
*Assistant Examiner* — Jessica Paul
(74) *Attorney, Agent, or Firm* — Oliff & Berridge, PLC

(57) ABSTRACT

A pressure-sensitive adhesive composition capable of giving a pressure-sensitive adhesive sheet which simultaneously realizes satisfactory holding power, adhesion, and peel resistance in peeling from curved surfaces, while balancing these properties, and has satisfactory heat resistance. The composition comprises the following ingredients: (A) a maleimide crosslinking agent having two or more maleimide groups per molecule; (B) a monomer which, when caused to homopolymerize, gives a homopolymer having a glass transition temperature of −40° C. or lower; (C) a carboxylated monomer copolymerizable with the monomer of the ingredient (B); and (D) a photopolymerization initiator, the maleimide crosslinking agent of the ingredient (A) being contained in an amount of 0.01-2 parts by weight per 100 parts by weight of the sum of the monomers of the ingredients (B) and (C).

7 Claims, No Drawings

ADHESIVE COMPOSITION AND ADHESIVE SHEET

TECHNICAL FIELD

The present invention relates to an adhesive composition that exhibits adhesion upon irradiation with active energy rays (such as ultraviolet rays). The present invention also relates to an adhesive sheet that uses the adhesive composition.

BACKGROUND ART

Holding power, adhesive strength and curved-surface peel resistance are some of the properties required of an adhesive. It has been widely recognized that the holding power and the adhesive strength of an adhesive are contradictory properties, as are the holding power and the curved-surface peel resistance. For example, increasing the holding power of an adhesive by increasing the amount of the crosslinking agent added to the adhesive to thereby increase the degree of crosslinking of the adhesive can lead to an increased molecular weight of the polymer component of the adhesive and can thus result in a decrease in the adhesive strength and the curved-surface adhesion resistance. On the other hand, decreasing the degree of crosslinking by decreasing the amount of the crosslinking agent added leads to a decreased molecular weight of the polymer component of the adhesive, resulting in an increased adhesiveness of the adhesive as well as in an increased adhesive strength thereof. This however decreases the heat resistance, holding power and curved-surface peel resistance of the adhesive.

An adhesive composition that exhibits the contradictory properties, i.e., holding power, adhesive strength and curved-surface peel resistance, in a well-balanced manner has been proposed (Patent Document 1). This adhesion composition is composed of a hard segment monomer whose homopolymer has a relatively high glass transition temperature (for example, 60° C. or above), a soft segment monomer whose homopolymer has a relatively low glass transition temperature (for example, −20° C. or below), a monomer whose homopolymer has an intermediate glass transition temperature, and a photoinitiator. Another type of adhesive composition has also been proposed that contains a monomer that can be homopolymerized to form a homopolymer with a glass transition temperature of −50° C. or below, an imide (meth) acrylate that is used in an amount of 1 to 20 parts by weight with respect to 100 parts by weight of the monomer, a photopolymerization initiator, and optional acrylic acid (Patent Document 2).

Patent Document 1: Japanese Patent Application Laid-Open No. 2000-073025
Patent Document 2: Japanese Patent Application Laid-Open No. 2002-285105

DISCLOSURE OF THE INVENTION

Problems to be Solved by the Invention

A major drawback of the adhesive composition proposed in Patent Document 1 is that increasing the amount of the soft segment component to increase the adhesive strength and the curved-surface peel resistance of the adhesive decreases the relative amount of the hard segment component, resulting in a decrease in the holding power, and, conversely, increasing the amount of the hard segment component to increase the holding power of the adhesive decreases the relative amount of the soft segment component, resulting in a decrease in the adhesive strength and the curved-surface peel resistance of the adhesive. The adhesive composition thus fails to achieve each property at a sufficient level.

On the other hand, the adhesive composition proposed in Patent Document 2, which is obtained by polymerizing a monomer whose homopolymer has a glass transition temperature of −50° C. or below and an imide (meth)acrylate in predetermined proportions, exhibits improved holding power, adhesive strength and curved-surface peel resistance as compared to the adhesive composition of Patent Document 1. However, this adhesion composition fails to simultaneously achieve high temperature holding power and high curved-surface peel resistance, the required properties for adhesive sheets used in automobile engines or heat-resistant adhesive sheets used in a reflow soldering process during the production of circuit boards.

The present invention addresses the above-described problems of the conventional technology. It is therefore an object of the present invention to provide a photopolymerizable adhesive composition that simultaneously achieves high holding power, adhesion strength and curved-surface peel resistance in a well-balanced manner and that can form adhesives with high heat resistance.

Means for Solving the Problems

The present inventors have found that the foregoing object of the present invention can be achieved by an adhesive obtained by polymerizing a particular adhesive composition. This composition can be obtained by blending a mixture of a major monomer that can be homopolymerized to form a homopolymer with a glass transition temperature of −40° C. or below, a carboxyl group-containing monomer and a photopolymerization initiator, with a relatively small amount of a maleimide crosslinking agent that contains at least two maleimide groups in one molecule. It is this discovery that ultimately led to the present invention.

Specifically, the present invention provides an adhesive composition, containing the following components:

(A) a maleimide crosslinking agent containing at least two maleimide groups in one molecule;
(B) a monomer that can be homopolymerized to form a homopolymer with a glass transition temperature of −40° C. or below;
(C) a carboxyl group-containing monomer that can be copolymerized with the monomer component (B); and
(D) a photopolymerization initiator, wherein the maleimide crosslinking agent of the component (A) is contained in an amount of 0.01 to 2 parts by weight with respect to 100 parts by weight of the total amount of the monomer components (B) and (C).

The present invention also provides an adhesive sheet including a substrate sheet, and an adhesive layer formed by applying the adhesive composition onto the substrate sheet and curing the composition.

As used herein, the term "(meth)acrylate" refers to an acrylate or a methacrylate and the term "(meth)acrylic acid" refers to an acrylic acid or a methacrylic acid.

Effects of the Invention

As described above, the adhesive composition of the present invention can be obtained by blending a mixture of a major monomer component that can be homopolymerized to form a homopolymer with a glass transition temperature of −40° C. or below, a carboxyl group-containing monomer and a photopolymerization initiator, with a relatively small amount of a maleimide crosslinking agent that contains at least two maleimide groups in one molecule. The composition can therefore be photopolymerized to form an adhesive that simultaneously achieves high holding power, adhesion strength and curved-surface peel resistance in a well-balanced manner and also has high heat resistance.

BEST MODE FOR CARRYING OUT THE INVENTION

The adhesive composition of the present invention includes: (A) a maleimide crosslinking agent containing at least two maleimide groups in one molecule; (B) a monomer that can be homopolymerized to form a homopolymer with a glass transition temperature of −40° C. or below; (C) a carboxyl group-containing monomer that can be copolymerized with the monomer component (B); and (D) a photopolymerization initiator.

According to the present invention, the component (A), a maleimide crosslinking agent containing at least two maleimide groups in one molecule, serves to improve the high temperature holding power and the curved-surface peel resistance of the adhesive. Such a maleimide crosslinking agent containing at least two maleimide groups in one molecule can be obtained by reacting a diamine of the following formula (a) or (b) with maleic anhydride to form a maleimide.

[Chemical Formula 1]

$H_2N—C_6H_4—X—C_6H_4—NH_2$     (a)

$H_2N—Y—NH_2$     (b)

In the formula (a) or (b), X is —O—$C_6H_4$—O—, —$SO_2$—, —$C_6H_4$—, —O—, —CO—, —$CH_2$—, —C($CH_3$)$_2$— or —O—$C_6H_4$—C($CH_3$)$_2$—$C_6H_4$—O— and Y is —$C_6H_4$—, —$C_6H_4$—$C_6H_4$— or —$CH_2$—$C_6H_4$—$CH_2$—.

Specific examples of the component (A) include 4,4'-dimaleimidediphenylmethane, metaphenylenedimaleimide, 4,4'-dimaleimidediphenylsulfone, 1,3-bis(3-maleimidephenoxy)benzene, 3,3'-maleimidediphenylsulfone, paraphenylenedimaleimide, 4,4'-dimaleimidediphenyl ether, 4,4'-dimaleimidediphenylsulfide, 4,4'-dimaleimide diphenyl ketone, aniline-xylylene copolymer-based maleimides and 2,2-di{(4,4'-dimaleimidediphenoxy)phenyl}propane. Of these, 4,4'-dimaleimidediphenylmethane, aniline-xylylene copolymer-based maleimides and 2,2-di{(4,4'-dimaleimidediphenoxy)phenyl}propane are preferred with aniline-xylylene copolymer-based maleimides being particularly preferred. Such aniline-xylylene copolymer-based maleimides are represented by the formula (1) below, where n is a number from 0 to 3, preferably a number from 0 to 2. Specific examples of the maleimide of the formula (1) include those obtained by reacting maleic anhydride with Anilix-A110 (MW=approx. 350), Anilix-A15 (MW=approx. 400 to 450), or Anilix-A13 (MW=approx. 600 to 650), each an aniline-xylylene copolymer manufactured by Mitsui Fine Chemicals, Inc.

(1)

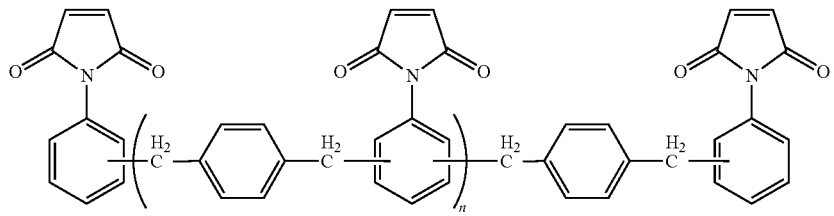

The maleimide crosslinking agent of the component (A) is present in the adhesive composition of the present invention typically in a proportion of 0.01 to 2 parts by weight, and preferably in a proportion of 0.05 to 1.40 parts by weight with respect to 100 parts by weight of the total amount of the monomer component (B), which as described later can be homopolymerized to form a homopolymer with a glass transition temperature of −40° C. or below, and the carboxyl group-containing monomer component (C). The maleimide crosslinking agent (A) present in a proportion of less than 0.01 parts by weight can result in a decreased heat resistance of the adhesive and insufficient creep of the adhesive at high temperatures. When present in a proportion of more than 2 parts by weight, it causes a decreased initial tack, making the adhesive defective.

The monomer component (B) that can be homopolymerized to form a homopolymer with a glass transition temperature (Tg) of −40° C. or below, the major monomer component used in the adhesive composition of the present invention, is used because monomers having a Tg higher than −40° C. decrease the tack of the adhesive. The monomer is preferably an acrylic acid ester of an alkyl alcohol or an alkoxyalkyl alcohol having 3 to 14 carbon atoms. Specific examples of such ester include n-propyl acrylate (Tg=−52° C.), n-butyl acrylate (Tg=−54° C.), 2-ethylhexyl acrylate (Tg=−70° C.), isooctyl acrylate (Tg=−57° C.), hexyl acrylate (Tg=−57° C.), heptyl acrylate (Tg=−60° C.), nonyl acrylate (3,5,5-trimethylhexyl acrylate (Tg=−58° C.)), methoxyethyl acrylate (Tg=−50° C.), ethoxyethyl acrylate (Tg=−50° C.), methoxybutyl acrylate (Tg=−56° C.), 3-methoxypropyl acrylate (Tg=−75° C.) and butoxyethyl acrylate (Tg: −40° C. or below).

Of these, 2-ethylhexyl acrylate is particularly preferred because of its low glass transition temperature and low cost.

Preferably, the monomer component (B) is homopolymerized by a radical polymerization process. The polymerization is preferably activated by ultraviolet rays.

The carboxyl group-containing monomer component (C) which can be copolymerized with the monomer component (B) is used in the adhesive composition of the present invention to serve to enhance the cohesion force and adhesion of the adhesive. Examples of the carboxyl group-containing monomer (C) include (meth)acrylic acid, ethylene oxide-modified (meth)acrylic acid and ethylene oxide-modified succinic acid (meth)acrylate.

The carboxyl group-containing monomer component (C) is contained preferably in an amount of 0.5 to 15 wt %, and more preferably in an amount of 1 to 12 wt % of the total amount of the monomer component (B) and the monomer component (C): Too little of the monomer component (C) cannot provide desired effects, whereas too much of it results in a decrease in the tack, the adhesion and, in some cases, the water proof performance of the adhesive.

The photopolymerization initiator of the component (D) used in the adhesive composition of the present invention may be an acetophenone photopolymerization initiator, a benzophenone photopolymerization initiator or a thioxanthone photopolymerization initiator. Specific examples of the photopolymerization initiator (D) include 2,2-dimethoxy-1,2-diphenylethane-1-one (IRGACURE 651, Ciba Specialty Chemicals), 1-hydroxy-cyclohexyl phenyl ketone (IRGACURE 184, Ciba Specialty Chemicals), 2-hydroxy-2-methyl-1-phenyl-propane-1-one (DAROCURE 1173, Merck), a mixture of 1-hydroxy-cyclohexyl phenyl ketone and benzophenone (IRGACURE 500, Ciba Specialty Chemicals), 1-[4-(2-hydroxyethoxy)-phenyl]-2-hydroxy-2-methylpropane-1-one, 2-methyl-1-[4-(methylthio)phenyl]-2-morpholinopropane-1-one (IRGACURE 907, Ciba Specialty Chemicals), 2-benzyl-2-dimethylamino-1-(1-morpholinophenyl)-butane-1-one (IRGACURE 369, Ciba Specialty Chemicals), a mixture of bisacylphosphine oxide and α-hydroxy ketone (IRGACURE 1700, Ciba Specialty Chemicals), bis(2,4,6-trimethylbenzoyl)-phenylphosphine oxide (IRGACURE 819, Ciba Specialty Chemicals) and 3,3',4,4'-tetra-(t-butylperoxycarbonyl)benzophenone (BTTB, NOF Corporation).

The photopolymerization initiator of the component (D) is contained preferably in an amount of 0.05 to 3.0 parts by weight, and more preferably in an amount of 0.1 to 2.0 parts by weight with respect to 100 parts by weight of the total amount of the components (A), (B) and (C): Too little of the photopolymerization initiator (D) results in a decreased degree of polymerization, whereas too much of it leads to a decreased molecular weight.

The adhesive composition of the present invention may further contain a monomer that can be homopolymerized to form a homopolymer with a glass transition temperature of higher than −40° C. and can be copolymerized with the monomer (B) which can form a homopolymer with a glass transition temperature of −40° C. or below. The monomer is typically added in an amount of 1 to 50 parts by weight, and preferably in an amount of 10 to 25 parts by weight with respect to 100 parts by weight of the monomer component (B).

Examples of such copolymerizable compounds include acrylic acid esters of cyclic alkyl alcohols or alkyl alcohols having 2 or less carbon atoms, and other acrylic acid derivatives. Specific examples of such compounds include ethyl acrylate (Tg=−22° C.), 2-hydroxyethyl acrylate and isobornyl acrylate (Tg=90° C.). Oligoester acrylates, such as phenoxydiethylene glycol acrylate (Tg=−25° C.), may also be used. Among them, isoboronyl acrylate is particularly preferred.

Other compounds that can be copolymerized with the monomer component (B) include polyfunctional oligoacrylates having 300 or greater molecular weight, or esters formed of two or more acrylic acids and a polyol. The use of such polyfunctional oligoacrylates further enhances the cohesion force of the adhesive at high temperatures. The molecular weight of the polyfunctional oligoacrylates must be 300 or greater since the distance between crosslinking molecules becomes small in the oligoacrylates with molecular weights of less than 300 so that even small variations in the amount of the polyfunctional oligoacrylate can significantly affect the cohesion force of the adhesive layer, making it difficult to control the cohesion force process.

The polyfunctional oligoacrylate is preferably configured such that the vinyl groups forming two ester groups are separated by 10 or more carbon atoms. Specific examples of such polyfunctional oligoacrylates include polyalkylene glycol diacrylate, such as polyethylene glycol diacrylate, ethylene oxide-modified bisphenol A diacrylate, hydroxypivalic acid neopentyl glycol diacrylate and urethane acrylate.

When the polyfunctional oligoacrylate is used, its amount is preferably in the range of 0.0001 to 0.002 parts by weight, and more preferably in the range of 0.0005 to 0.0015 parts by weight with respect to 100 parts by weight of the monomer component (B). Too little of the polyfunctional oligoacrylate cannot increase the heat resistance of the adhesive layer to a desired degree, whereas too much of it results in a decreased tack of the adhesive layer.

The adhesive composition of the present invention preferably uses a nitrogen-containing reactive solvent to dissolve the maleimide crosslinking agent of the component (A), which forms a solid at room temperature. Preferred examples of such reactive solvents include N,N-dimethylacrylamide (Tg=18° C. or below), dimethylaminoethylacrylate (Tg=18° C. or below), dimethylaminoethylmethacrylate (Tg=18° C. or below), N-vinylpyrrolidone (Tg=175° C.) and morpholine acrylamide (MW=141, Tg=145° C.). These reactive solvents are preferably used in the adhesive composition of the present invention.

The adhesive composition of the present invention can be produced by dissolving the maleimide crosslinking agent of the component (A) in the reactive solvent and uniformly mixing the solution with the components (B), (C) and (D). The mixing can be effected by common techniques.

One preferred application of the adhesive composition of the present invention is the adhesive layer of adhesive sheets. Such adhesive sheets can be produced by applying the adhesive composition of the present invention to at least one surface of a substrate sheet, and irradiating the coated surface with active energy rays (such as ultraviolet rays) to cure the composition to form an adhesive layer. Alternatively, the adhesive composition may be applied to a peelable paper sheet. The coated sheet is then irradiated with an active energy ray to form a stage B (semicured) adhesive, which in turn is dry-laminated to at least one surface of a substrate sheet to form a layer of the stage B adhesive. Irradiating the layer with an active energy ray cures the adhesive and thus completes the adhesive sheet. The substrate sheet may have the same construction as the substrate sheet used in conventional adhesive sheets. The adhesive layer of the adhesive sheet of the present invention may be formed to have the same thickness as the adhesive layer in conventional adhesive sheets.

Preferably the adhesive composition is cured by sequentially irradiating with a low illuminance (for example, 1 mW/cm$^2$ to 5 mW/cm$^2$) and a high illuminance (for example, 30 mW/cm$^2$ to 100 mW/cm$^2$) of ultraviolet rays emitted from an ultraviolet lamp. Such a curing process increases the molecular weight and improve the degree of reaction and the adhesion performances. A cumulative light quantity of 1 J/cm$^2$ or more can achieve a 98.0% or higher degree of reaction. The ultraviolet lamp used for this purpose may be any lamp that emits ultraviolet rays with a wavelength of 200 nm to 400 nm, including low pressure mercury lamps, metal halide lamps and high pressure mercury lamps.

EXAMPLES

The present invention will now be described in detail with reference to examples.

Preparation of Partial Polymer (A)

900 parts by weight of 2-ethylhexylacrylate, 100 parts by weight of acrylic acid and 0.2 parts by weight of a photopolymerization initiator (IRGACURE 651, Ciba Specialty Chemicals) were placed in a three-necked flask equipped with a stirring plate, a nitrogen gas inlet, a thermometer and an optical fiber for ultraviolet irradiation. The air in the flask was replaced by nitrogen gas. While stirred with the stirring plate, the reaction mixture was irradiated with ultraviolet rays for polymerization. As the polymerization proceeded, the temperature of the mixture increased, causing the viscosity of the mixture to increase. Once the temperature of the mixture reached 40° C., the irradiation was ceased to terminate the reaction. This gave a partial polymer (A) as a transparent viscous liquid. When the partial polymer (A) was dried at 135° C. for 30 min, the weight of the product was decreased by 97 wt %. The viscosity of the partial polymer (A) as measured by a rotary viscometer at 25° C. was 10.0 dPa·s.

Preparation of Masterbatch 1

94.00 parts by weight of the partial polymer (A), 0.61 parts by weight of acrylic acid, 0.039 parts by weight of isobornyl acrylate and 0.20 parts by weight of a photopolymerization initiator (IRGACURE 651, Ciba Specialty Chemicals) were uniformly mixed to make a Masterbatch 1.

Preparation of Masterbatch 2

99.8 parts by weight of the partial polymer (A) and 0.2 parts by weight of the photopolymerization initiator (IRGACURE 651, Ciba Specialty Chemicals) were uniformly mixed to make a Masterbatch 2.

Preparation of Crosslinking Agents

The following crosslinking agent solutions were used in corresponding Examples and Comparative Examples.

Crosslinking Agent Solution (a) (Used in Examples 1, 5 and 6)

A 10 wt % solution of an aniline-xylylene copolymer-based maleimide (Brand Name: Anilix-MI, Mitsui Fine Chemicals, Inc.) (Solvent: morpholine acrylamide).

Crosslinking Agent Solution (b) (Used in Examples 2 and 7)

A 10 wt % solution of 2,2-di{(4,4'-dimaleimidediphenoxy)phenyl}propane (Brand Name: BMI-4000, Mitsui Fine Chemicals, Inc.) (Solvent: morpholine acrylamide).

Crosslinking Agent Solution (c) (Used in Comparative Examples 1 and 4)

A 10 wt % solution of neopentyl glycol hydroxypivalate diacrylate (KAYARAD MANDA, Nippon Kayaku) (Solvent: morpholine acrylamide).

Crosslinking Agent Solution (d) (Used in Example 3)

A 10 wt % solution of an aniline-xylylene copolymer-based maleimide (Brand Name: Anilix-MI, Mitsui Fine Chemicals, Inc.) (Solvent: N,N-dimethylacrylamide).

Crosslinking Agent Solution (e) (Used in Example 4)

Bismaleimide (A 10 wt % solution of N,N-diphenyl-methane bismaleimide (DPMDMI) (Solvent: N,N-dimethylacrylamide)).

Crosslinking Agent Solution (f) (Used in Comparative Example 2)

A 10 wt % solution of neopentyl glycol hydroxypivalate diacrylate (KAYARAD MANDA, Nippon Kayaku) (Solvent: N,N-dimethylacrylamide).

Crosslinking Agent Solution (g) (Used in Comparative Examples 3 and 5)

A 10 wt % solution of 1,6-hexanediol diacrylate (KAYARAD HDDA, Nippon Kayaku) (Solvent: morpholine acrylamide).

Examples 1 Through 7, and Comparative Examples 1 Through 5

UV-curable liquid adhesive compositions were prepared by uniformly mixing the corresponding components shown in Tables 1 and 2. The components were mixed by a known mixing technique. In the composition of Example 1, the net amount of the crosslinking agent is 0.2 parts by weight ($3.73 \times 10^{-4}$ mol) and the net amount of the solvent is 1.8 parts by weight ($1.28 \times 10^{-2}$ mol). In the composition of Example 2, the net amount of the crosslinking agent is 0.2 parts by weight ($3.5 \times 10^{-4}$ mol) and the net amount of the solvent is 1.8 parts by weight ($1.28 \times 10^{-2}$ mol). In the composition of Comparative Example 1, the net amount of the crosslinking agent is 0.2 parts by weight ($6.41 \times 10^{-4}$ mol) and the net amount of the solvent is 1.8 parts by weight ($1.28 \times 10^{-2}$ mol)

Each of the resulting adhesive compositions was applied to a peelable paper sheet, which was obtained from a peelable base with either surface release-treated with silicone. The applied coating was overlaid with a 50 μm-thick PET film with one surface treated with silicone. The resulting laminate was compressed between two rolls so that the adhesive layer was 50 μm thick. Ultraviolet rays (5 mW/cm$^2$ and 50 mW/cm$^2$) were then sequentially irradiated onto the laminate on the side laminated with the PET film to cure the adhesive layer. This completed a "non-support-type" adhesive sheet in which the adhesive layer was sandwiched between the peelable paper sheet and the PET film. Each adhesive sheet was then tested for the following properties.

TABLE 1

| | Ex. 1 | Ex. 2 | Comp. Ex. 1 | Ex. 3 | Ex. 4 | Comp. Ex. 2 |
|---|---|---|---|---|---|---|
| Masterbatch 1 | 98.0 | 98.0 | 98.0 | 98.0 | 98.0 | 98.0 |
| Masterbatch 2 | — | — | — | — | — | — |
| Crosslinking agent solution a | 2.0 | — | — | — | — | — |
| Crosslinking agent solution b | — | 2.0 | — | — | — | — |
| Crosslinking agent solution c | — | — | 2.0 | — | — | — |
| Crosslinking agent solution d | — | — | — | 2.0 | — | — |
| Crosslinking agent solution e | — | — | — | — | 2.0 | — |
| Crosslinking agent solution f | — | — | — | — | — | 2.0 |
| Crosslinking agent solution g | — | — | — | — | — | — |
| 2-phthalimide ethyl acrylate | — | — | — | — | — | — |
| Morpholine acrylamide | — | — | — | — | — | — |

TABLE 2

|  | Ex. 5 | Comp. Ex. 3 | Ex. 6 | Ex. 7 | Comp. Ex. 4 | Comp. Ex. 5 |
|---|---|---|---|---|---|---|
| Masterbatch 1 | — | — | — | — | — | — |
| Masterbatch 2 | 94.25 | 94.25 | 94.25 | 94.25 | 94.25 | 94.25 |
| Crosslinking agent solution a | 1.5 | — | 1.5 | — | — | — |
| Crosslinking agent solution b | — | — | — | 1.5 | — | — |
| Crosslinking agent solution c | — | — | — | — | 1.5 | — |
| Crosslinking agent solution d | — | — | — | — | — | — |
| Crosslinking agent solution e | — | — | — | — | — | — |
| Crosslinking agent solution f | — | — | — | — | — | — |
| Crosslinking agent solution g | — | 1.5 | — | — | — | 1.5 |
| 2-phthalimide ethyl acrylate | — | — | 4.25 | 4.25 | 4.25 | 4.25 |
| Morpholine acrylamide | 4.25 | 4.25 | — | — | — | — |

<Amount of Coating (g/m²)>

A piece of a predetermined size was cut out from each adhesive sheet. The piece was stripped of the peelable paper sheet and the PET film and weighed. The weight per unit area was then calculated. The results are shown in Tables 3 and 4.

<Degree of Reaction (%)>

A 10 cm×10 cm sample piece was cut out from each adhesive sheet. The sample piece was stripped of the peelable paper sheet and the PET film and weighed (W1). The sample piece was then dried at 135° C. for 30 min, allowed to cool to room temperature, and weighed again (W2). The degree of reaction was then determined by the following equation: The degree of reaction (%)=(W2/W1)×100. The results are shown in Tables 3 and 4.

<90° Peel Strength>

One surface of a 25 mm×150 mm×2 mm stainless plate was polished with a No. 280 waterproof abrasive paper. A 20 mm×100 mm piece of the adhesive sheet was applied to the polished surface of the stainless plate with the peelable paper side facing the plate. A 25 mm×100 mm strip of a 25 µm-thick polyimide film (KAPTON, DuPont-Toray) was then applied over the adhesive sheet. Similarly, another piece of the same adhesive sheet was applied to the stainless plate with the peelable PET side facing the plate. A polyimide film was applied over the adhesive sheet in a similar manner. The two pieces were left stuck to the plate for 1 hour and were subsequently peeled at 90 degrees at a rate of 300 mm/min to determine the 90° peel strength for either side of the adhesive sheet. The results are shown in Tables 3 and 4.

<Holding Power at High Temperature>

A test piece was prepared from each adhesive sheet according to JIS Z1528. During the test, the test piece was evaluated for the holding power at a particular temperature. Specifically, the sample piece was placed under a load (25 mm×25 mm lap/1 kg load) and maintained at 150° C. for 60 min and the distance (mm) that the test piece moved during the 60-minute period was measured. Also measured was the time that it took for the lapped surface to fracture. As in the 90° peel test, the test piece was evaluated on either side. The results are shown in Tables 3 and 4.

<Curved-surface Peel Resistance>

A cylinder, 25 mm in diameter and 1 mm in thickness, was wrapped with a 75 µm-thick polyimide film (KAPTON, DuPont-Toray). The film was secured to the cylinder by a strip of double-sided tape. Meanwhile, a 225 µm-thick polyimide film (APICAL, Kaneka) was laminated with the sample test tape. The laminate was passed through a laminator at a roll temperature of 80° C. so that the polyimide film and the sample test adhesive tape were tightly adhered to each other. The laminate was then cut into 10 mm×50 mm sample strips. The sample strips were applied to the curved surface of the polyimide film-wrapped cylinder. The sample strips were then left for 24 hours at 24° C., at 40° C., at 70° C. or at 100° C., respectively, and the degree of peeling was measured for each strip as the magnitude of the gap formed between the surface of the cylinder and the sample strip. Specifically, each sample strip was rated on a scale of "A" to "C" where "A" indicates that the gap between the curved surface of the cylinder and the sample strip was less than 1 mm, "A⁻" indicates that the gap was 1 mm or greater and less than 1.5 mm, "B" indicates that the gap was 1.5 mm or greater and less than 2.0 mm, and "C" indicates that the gap was 2.0 mm or greater. The results are shown in Tables 3 and 4.

<90° Peel Test Under Constant Load>

One surface of a 25 mm×150 mm×2 mm stainless plate was polished with a No. 280 waterproof abrasive paper. A 20 mm×100 mm piece of the adhesive sheet was applied to the polished surface of the stainless plate with the back side facing the plate. A 25 mm×150 mm strip of a 25 µm-thick polyimide film (KAPTON, DuPont-Toray) was then applied over the adhesive sheet. The polyimide/adhesive laminate was peeled from the stainless plate 20 mm from the end of the laminate. A 100 g weight was suspended from the end of the laminate where no adhesive was deposited. The time that it took for the laminate to peel over a length of 50 mm was measured, as was the length of the peel after 24 hours. Similarly, the 50 mm peel time and the peel length after 24 hours were determined for the front side of the adhesive sheet (23° C., 60% RH). The results are shown in Tables 3 and 4.

TABLE 3

|  | Ex. 1 | Ex. 2 | Comp. Ex. 1 | Ex. 3 | Ex. 4 | Comp. Ex. 2 |
|---|---|---|---|---|---|---|
| Amount of coating (g/m²) | 47.4 | 49.9 | 45.9 | 47.0 | 50.0 | 49.0 |
| Degree of reaction (%) | 98.3 | 99 | 99.1 | 99.1 | 98.8 | 98.8 |
| 90° peel strength (N/2 cm) | | | | | | |
| Front | 9.0 | 10.2 | 8.3 | 9.2 | 7.8 | 7.6 |
| Back | 10.6 | 11.6 | 8.3 | 12.2 | 9.6 | 8.8 |
| Holding power at 150° C. (mm) | | | | | | |
| Front | 0.1 | 0.2 | Fall at 13 min. | 0.2 | 0.0 | Fall at 6 min. |
| Back | 0.1 | 0.1 | 0.1 | 0.1 | 0.0 | 0.2 |
| Curved-surface peel resistance | | | | | | |
| at 24° C. | A | A | A | A | A | A |
| at 40° C. | A | A | A | A | A | A |
| at 70° C. | A | A | B | A | A | C |
| at 100° C. | A | A | C | A | C | — |
| Peel strength under constant load (mm) | | | | | | |
| Front | 8.0 | 10.0 | 12.0 | 12.0 | 23.0 | 14.0 |
| Back | 6.0 | 7.0 | 73.0 | 5.5 | 35.0 | 5.5 |

TABLE 4

|  | Ex. 5 | Comp. Ex. 3 | Ex. 6 | Ex. 7 | Comp. Ex. 4 | Comp. Ex. 5 |
|---|---|---|---|---|---|---|
| Amount of coating (g/m$^2$) | 49.5 | 53.5 | 54.8 | 53.8 | 52.0 | 54.7 |
| Degree of reaction (%) | 99 | 98.9 | 99.1 | 98.9 | 98.8 | 98.9 |
| 90° peel strength (N/2 cm) | | | | | | |
| Front | 8.2 | 7.4 | 10.8 | 8.8 | 10.8 | 8.4 |
| Back | 9.6 | 8.2 | 16.7 | 15.2 | 15.4 | 9.6 |
| Holding power at 150° C. (mm) | | | | | | |
| Front | 0.4 | Fall at 25 min. | 0.2 | 0 | 0 | Fall at 24 min. |
| Back | 0.2 | 0.0 | 0.1 | 10 | Fall at 11 min. | 0 |
| Curved-surface peel resistance | | | | | | |
| at 24° C. | A | A | A | A | A | A |
| at 40° C. | A | A | A | A | A | A |
| at 70° C. | A | A | A | A | B | A |
| at 100° C. | A | A | B | B | C | B |
| Peel strength under constant load (mm) | | | | | | |
| Front | 7.0 | Fall at 300 min. | 40.0 | 10.0 | 40.0 | Fall at 220 min. |
| Back | 4.0 | 15.0 | 20.0 | 20.0 | 32.0 | Fall at 535 min. |

As can be seen from the results of Tables 3 and 4, each of the adhesive sheets of the present invention, crosslinked by the maleimide crosslinking agent that has at least two maleimide groups in one molecule, shows high holding power and high curved-surface peel resistance at high temperatures, showing only small differences, if any, in the physical properties between the sides of the adhesive. The adhesive sheets of the present invention therefore exhibit stable viscosity.

INDUSTRIAL APPLICABILITY

The adhesive composition of the present invention has high holding power, adhesion and curved-surface peel resistance in a well-balanced manner and can thus be used to make adhesive sheets with high heat resistance.

The invention claimed is:

1. An adhesive composition, comprising the following components:
    (A) an aniline-xylylene copolymer-based maleimide crosslinking agent represented by formula (1):

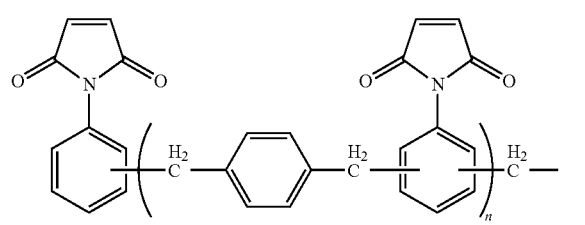

(1)

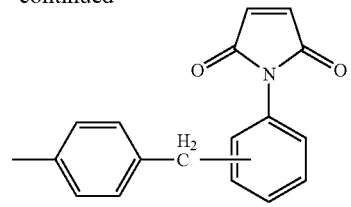

wherein n is a number from 0 to 2;
    (B) a 2-ethylhexyl acrylate;
    (C) a carboxyl group-containing monomer that can be copolymerized with the monomer component (B); and
    (D) a photopolymerization initiator, wherein the maleimide crosslinking agent of the component (A) is contained in an amount of 0.05 to 1.4 parts by weight with respect to 100 parts by weight of the total amount of the monomer components (B) and (C).

2. The adhesive composition according to claim 1, wherein the carboxyl group-containing monomer component (C) is (meth)acrylic acid, ethylene oxide-modified (meth)acrylic acid or ethylene oxide-modified succinic acid (meth)acrylate.

3. The adhesive composition according to claim 1, wherein the carboxyl group-containing monomer component (C) is contained in an amount of 0.5 to 15 wt % of the total amount of the monomer component (B) and the monomer component (C).

4. The adhesive composition according to claim 1, wherein the photopolymerization initiator of the component (D) is an acetophenone photopolymerization initiator, a benzophenone photopolymerization initiator or a thioxanthone photopolymerization initiator.

5. The adhesive composition according to claim 1, wherein the photopolymerization initiator of the component (D) is 2,2-dimethoxy-1,2-diphenylethane-1-one, 1-hydroxy-cyclohexyl phenyl ketone, 2-hydroxy-2-methyl-1-phenyl-propane-1-one, a mixture of 1-hydroxy-cyclohexyl phenyl ketone and benzophenone, 1-[4-(2-hydroxyethoxy)-phenyl]-2-hydroxy-2-methylpropane-1-one, 2-methyl-1-[4-(methylthio)phenyl]-2-morpholinopropane-1-one, 2-benzyl-2-dimethylamino-1-(1-morpholinophenyl)-butane-1-one, a mixture of bisacylphosphine oxide and a-hydroxy ketone, bis(2,4,6-trimethylbenzoyl)-phenylphosphine oxide or 3,3', 4,4'-tetra-(t-butylperoxycarbonyl)benzophenone.

6. The adhesive composition according to claim 1, wherein the photopolymerization initiator of the component (D) is contained in an amount of 0.05 to 3.0 parts by weight with respect to 100 parts by weight of the total amount of the components (A), (B) and (C).

7. An adhesive sheet comprising:
    a substrate sheet; and
    an adhesive layer formed by applying an adhesive composition onto the substrate sheet and curing the composition, wherein the adhesive composition comprises:
(A) an aniline-xylylene copolymer-based maleimide crosslinking agent represented by formula (1):

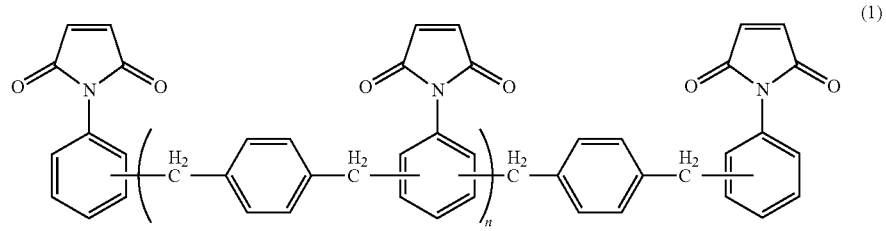

wherein n is a number from 0 to 2;
(B) a 2-ethylhexyl acrylate;
(C) a carboxyl group-containing monomer that can be copolymerized with the monomer component (B); and
(D) a photopolymerization initiator, wherein the maleimide crosslinking agent of the component (A) is contained in an amount of 0.05 to 1.4 parts by weight with respect to 100 parts by weight of the total amount of the monomer components (B) and (C).

* * * * *